(12) United States Patent
Tanaka et al.

(10) Patent No.: US 12,316,173 B2
(45) Date of Patent: May 27, 2025

(54) METHOD OF MANUFACTURING ROTOR AND METHOD OF MANUFACTURING MOTOR

(71) Applicant: NIDEC CORPORATION, Kyoto (JP)

(72) Inventors: Junya Tanaka, Kyoto (JP); Tomoya Ueda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 586 days.

(21) Appl. No.: 17/598,297

(22) PCT Filed: Jan. 10, 2020

(86) PCT No.: PCT/JP2020/000564
§ 371 (c)(1),
(2) Date: Sep. 27, 2021

(87) PCT Pub. No.: WO2020/195005
PCT Pub. Date: Oct. 1, 2020

(65) Prior Publication Data
US 2022/0181954 A1 Jun. 9, 2022

(30) Foreign Application Priority Data
Mar. 28, 2019 (JP) ................................ 2019-064844

(51) Int. Cl.
*H02K 15/03* (2025.01)
*H02K 1/2713* (2022.01)

(52) U.S. Cl.
CPC .......... *H02K 15/03* (2013.01); *H02K 1/2713* (2013.01)

(58) Field of Classification Search
CPC ..... H02K 15/03; H02K 1/2713; H02K 1/2783
See application file for complete search history.

(56) References Cited

U.S. PATENT DOCUMENTS 9,735,632 B2 * 8/2017 Iki .................... H02K 1/2766
9,985,506 B2 * 5/2018 Shibata ................. H02K 1/276
(Continued)

FOREIGN PATENT DOCUMENTS

CN 104377918 A * 2/2015 .............. H02K 1/16
JP 200472820 A 3/2004
(Continued)

OTHER PUBLICATIONS

International Search Report in PCT/JP2020/000564, mailed Mar. 10, 2020. 4pp.

*Primary Examiner* — Aneeta Yodichkas
*Assistant Examiner* — Jose K Abraham
(74) *Attorney, Agent, or Firm* — HAUPTMAN HAM, LLP

(57) ABSTRACT

One aspect of a method of manufacturing a rotor of the present invention is the method of manufacturing the rotor, which includes a rotor core rotatable about a central axis and a rotor magnet fixed to an outer peripheral surface of the rotor core, the method including a magnetization step of magnetizing a first magnetic member fixed to the outer peripheral surface of the rotor core to form the rotor magnet. The rotor core has a hole recessed from a surface on one side in an axial direction of the rotor core to the other side in the axial direction. In the magnetization step, the first magnetic member is magnetized in a state where a second magnetic member made of a magnetic material is inserted into the hole.

16 Claims, 6 Drawing Sheets

(56) References Cited

U.S. PATENT DOCUMENTS

| | | | | |
|---|---|---|---|---|
| 2005/0040721 A1* | 2/2005 | Kusase | ............... | H02K 1/32 |
| | | | | 310/156.43 |
| 2011/0012440 A1* | 1/2011 | Toyota | ............ | H02K 1/2792 |
| | | | | 310/152 |
| 2014/0084731 A1* | 3/2014 | Iwami | ............... | H02K 1/02 |
| | | | | 310/156.07 |
| 2014/0139065 A1* | 5/2014 | Yamada | ............... | H02K 1/27 |
| | | | | 310/156.66 |
| 2014/0139079 A1* | 5/2014 | Kato | ............... | H02K 1/2713 |
| | | | | 310/68 B |
| 2014/0225462 A1* | 8/2014 | Yamada | ........... | H02K 1/2713 |
| | | | | 310/44 |
| 2014/0225469 A1* | 8/2014 | Yoshikawa | ........ | H02K 15/03 |
| | | | | 310/156.53 |
| 2015/0069874 A1* | 3/2015 | Iki | ................... | H02K 1/274 |
| | | | | 310/156.11 |
| 2018/0212501 A1* | 7/2018 | Mayor | ............... | H02K 17/04 |
| 2019/0052137 A1* | 2/2019 | Yabe | ............... | F04B 39/00 |
| 2020/0212738 A1* | 7/2020 | Kano | ............... | H02K 21/14 |
| 2020/0228038 A1* | 7/2020 | Takahashi | ........... | H02K 1/16 |

FOREIGN PATENT DOCUMENTS

| | | | |
|---|---|---|---|
| JP | 201098891 A | | 4/2010 |
| JP | 2010130818 A | * | 6/2010 |
| JP | 2013126281 A | * | 6/2013 |
| JP | 2013247721 A | | 12/2013 |

* cited by examiner

METHOD OF MANUFACTURING ROTOR AND METHOD OF MANUFACTURING MOTOR

CROSS-REFERENCE TO RELATED APPLICATIONS

This is the U.S. national stage of application No. PCT/JP2020/000564, filed on Jan. 10, 2020, and priority under 35 U.S.C. § 119(a) and 35 U.S.C. § 365(b) is claimed from Japanese Patent Application No. 2019-064844, filed on Mar. 28, 2019.

FIELD OF THE INVENTION

The present invention relates to a method of manufacturing a rotor and a method of manufacturing a motor.

BACKGROUND

A motor in which a permanent magnet is fixed to a rotor core is known. For example, a motor in which permanent magnets are arranged in a Halbach array is known.

In the motor as described above, there is a case where the permanent magnet is formed by fixing a magnetic member made of a magnetic material to a rotor core and then magnetizing the magnetic member. In this case, for example, if a hole is provided in the rotor core for positioning or the like, the flow of magnetic flux passing through the magnetic member at the time of magnetization deteriorates, and there is a possibility that the magnetic member is hardly magnetized.

SUMMARY

One aspect of a method of manufacturing a rotor of the present invention is a method of manufacturing a rotor, which includes a rotor core rotatable about a central axis and a rotor magnet fixed to an outer peripheral surface of the rotor core, the method including a magnetization step of magnetizing a first magnetic member fixed to the outer peripheral surface of the rotor core to form the rotor magnet. The rotor core has a hole recessed from a surface on one side in an axial direction of the rotor core to the other side in the axial direction. In the magnetization step, the first magnetic member is magnetized in a state where a second magnetic member made of a magnetic material is inserted into the hole.

One aspect of a method of manufacturing a motor of the present invention includes the method of manufacturing the rotor described above.

The above and other elements, features, steps, characteristics and advantages of the present disclosure will become more apparent from the following detailed description of the preferred embodiments with reference to the attached drawings.

DETAILED DESCRIPTION

A Z-axis direction appropriately illustrated in each drawing is an up-and-down direction in which a positive side is an "upper side" and a negative side is a "lower side". A central axis J appropriately illustrated in each drawing is a virtual line which is parallel to the Z-axis direction and extends in the up-and-down direction. In the following description, an axial direction of the central axis J, that is, a direction parallel to the up-and-down direction will be simply referred to as the "axial direction", a radial direction having its center on the central axis J will be simply referred to as the "radial direction", and a circumferential direction having its center on the central axis J will be simply referred to as the "circumferential direction".

A side proceeding counterclockwise in the circumferential direction when viewed from the upper side to the lower side is referred to as "one side in the circumferential direction". A side proceeding clockwise in the circumferential direction when viewed from the upper side to the lower side is referred to as the "other side in the circumferential direction". The one side in the circumferential direction is a side that advances in a direction of an arrow θ illustrated in FIGS. 2 to 6. The other side in the circumferential direction is a side that advances in an opposite direction of the arrow θ illustrated in FIGS. 2 to 6.

In the embodiment, the lower side corresponds to one side in an axial direction, and the upper side corresponds to the other side in the axial direction. The up-and-down direction, the upper side, and the lower side are simply names for describing an arrangement relationship of each portion, and an actual arrangement relationship or the like may be an arrangement relationship other than the arrangement relationship indicated by these names.

Figure 1:
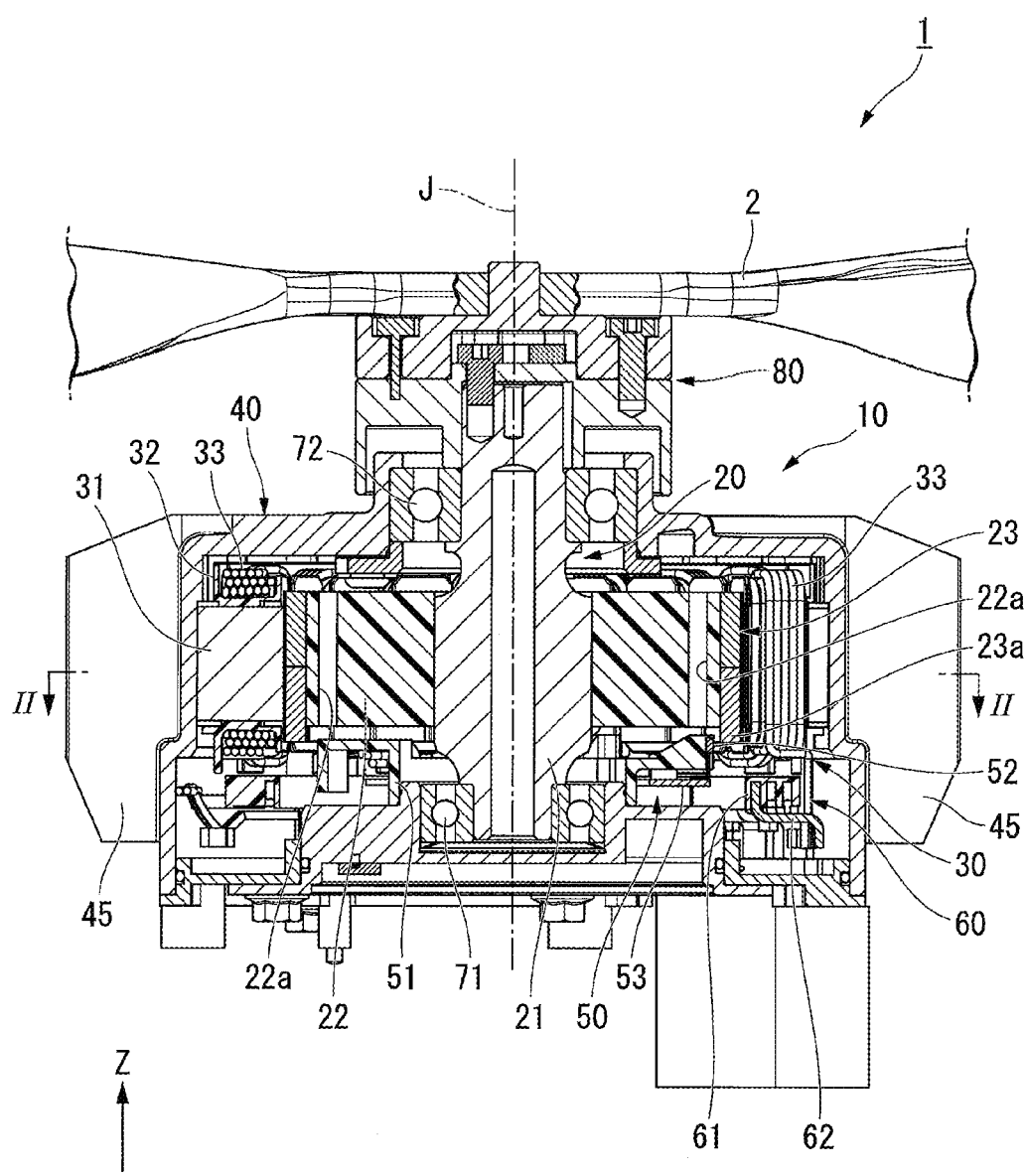
FIG. 1 is a cross-sectional view illustrating a rotor blade device according to the present embodiment.

As illustrated in FIG. 1, a motor 10 of the present embodiment is mounted on a rotor blade device 1. The rotor blade device 1 is mounted on, for example, an unmanned flying object. The rotor blade device 1 includes the motor 10 and a propeller 2.

In the present embodiment, the motor 10 is an inner-rotor motor. The motor 10 includes a housing 40, a stator 30, a busbar assembly 60, a rotor 20, a first bearing 71, a second bearing 72, a propeller mounting portion 80, and a sensor assembly 50.

The rotor 20, the stator 30, the sensor assembly 50, the busbar assembly 60, the first bearing 71, and the second bearing 72 are accommodated in the housing 40. A plurality of fins 45 arranged along the circumferential direction are provided on an outer peripheral surface of the housing 40.

Figure 2:
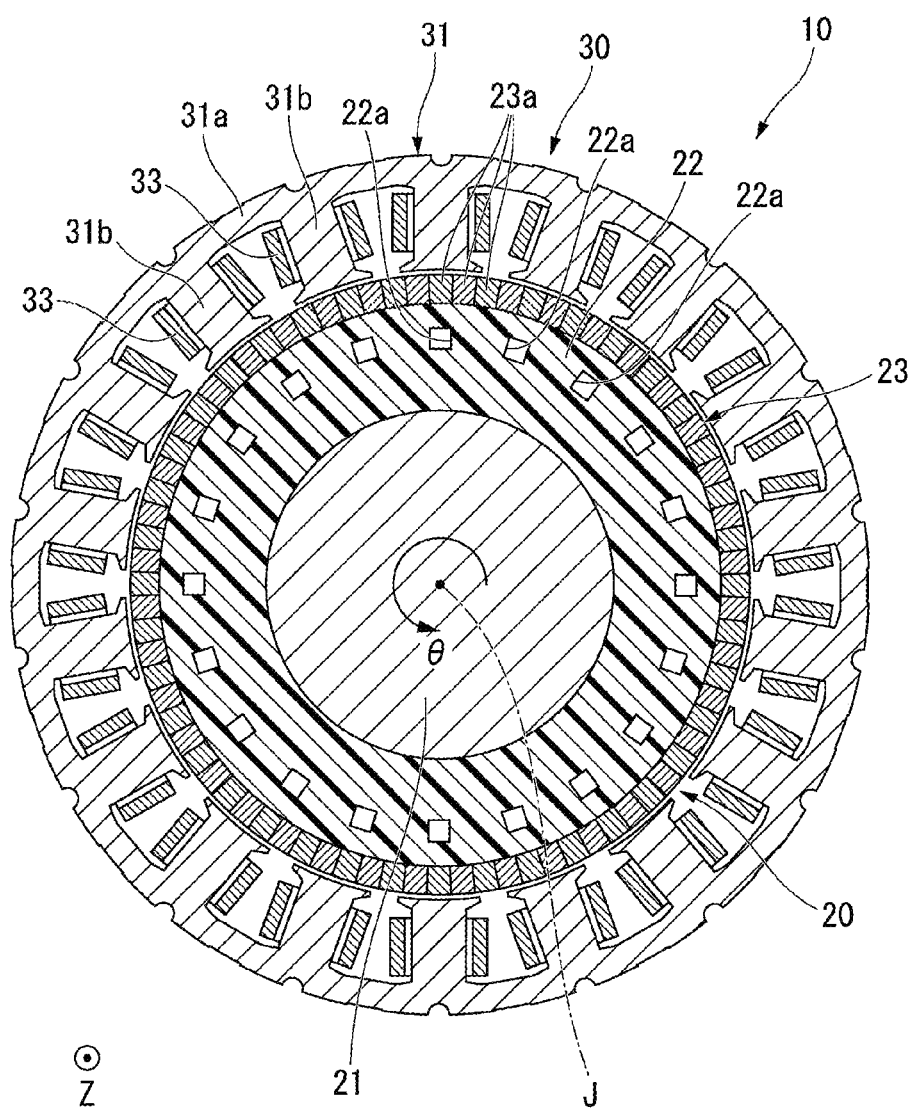
FIG. 2 is a cross-sectional view illustrating a rotor and a stator according to the present embodiment, and is a cross-sectional view taken along line II-II in FIG. 1.
Figure 3:
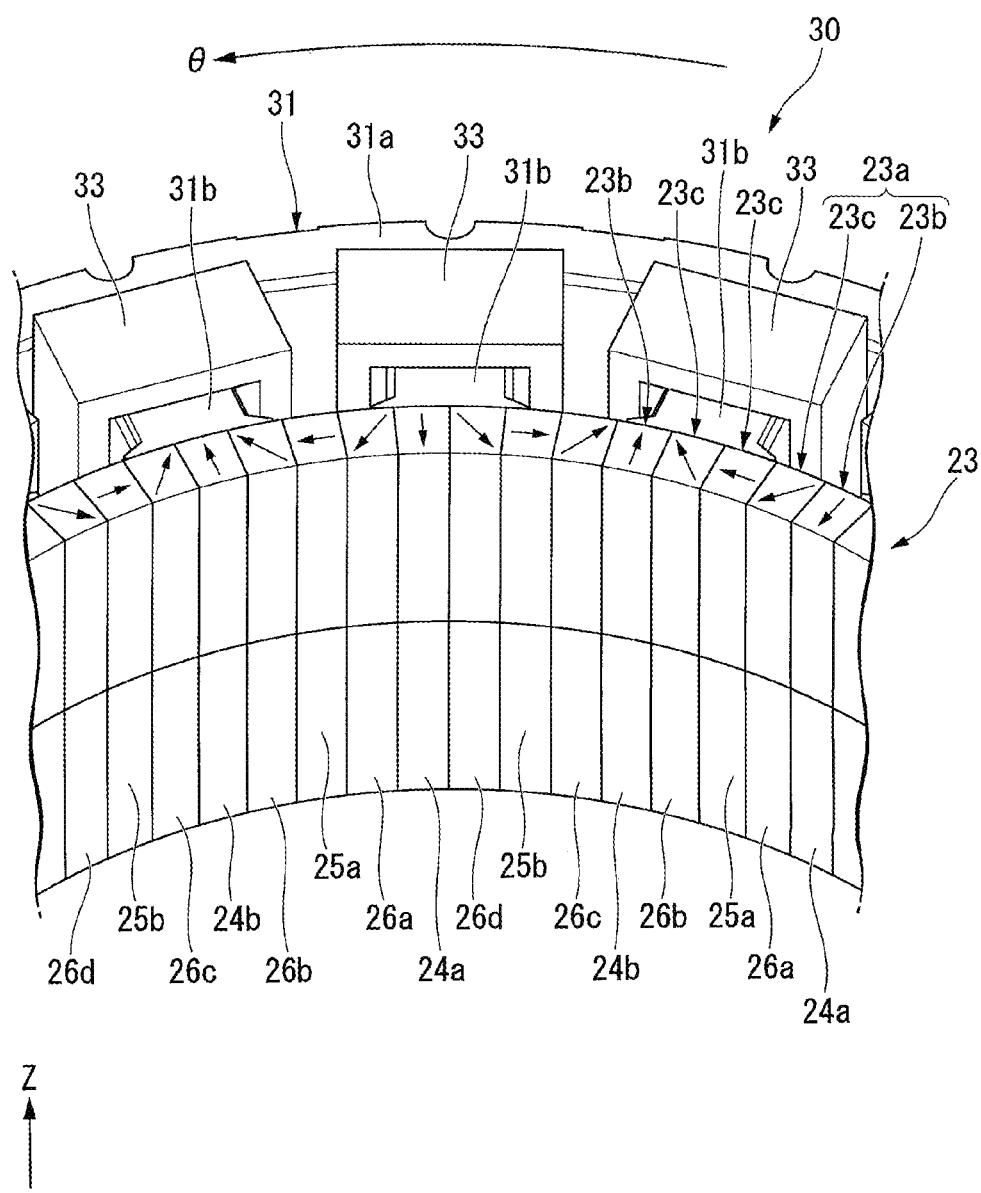
FIG. 3 is a perspective view illustrating a part of a rotor magnet and a part of the stator of the present embodiment.

In the present embodiment, the stator 30 is located on the radially outer side of the rotor 20. The stator 30 includes a stator core 31, an insulator 32, and a plurality of coils 33. As illustrated in FIGS. 2 and 3, the stator core 31 includes a core back 31*a* and a plurality of teeth 31*b*. The core back 31*a* has an annular shape surrounding the central axis J. The core back 31*a* has, for example, an annular shape centered on the central axis J. The plurality of teeth 31b extend to the radially inner side from the core back 31a. The plurality of teeth 31b are arranged at regular intervals along the circumferential direction over the entire circumference. For example, eighteen teeth 31b are provided.

The plurality of coils 33 are attached to the stator core 31 with the insulator 32 interposed therebetween. More specifically, the plurality of coils 33 are attached to the plurality of teeth 31b via the insulator 32. The insulator 32 is not illustrated in FIGS. 2 and 3.

As illustrated in FIG. 1, the busbar assembly 60 is located below the stator 30. The busbar assembly 60 is located on the radially outer side of the sensor assembly 50. The busbar assembly 60 includes a busbar holder 61 and a busbar 62. The busbar holder 61 holds the busbar 62. The busbar 62 is electrically connected to the coil 33.

The rotor 20 is rotatable about the central axis J. In the present embodiment, the rotor 20 is located on the radially inner side of the stator 30. The rotor 20 includes a shaft 21, a rotor core 22, and a rotor magnet 23. The shaft 21 is arranged along the central axis J. The shaft 21 has a columnar shape that extends in the axial direction with the central axis J as the center. An upper end of the shaft 21 protrudes upward from the housing 40.

The rotor core 22 is fixed to an outer peripheral surface of the shaft 21. The rotor core 22 has an annular shape surrounding the central axis J. In the present embodiment, the rotor core 22 has the annular shape centered on the central axis J. The rotor core 22 is rotatable about the central axis J together with the shaft 21. The rotor core 22 is a non-magnetic member made of a non-magnetic material. The rotor core 22 is made of resin, for example. The rotor core 22 may be made of non-magnetic metal such as aluminum.

The rotor core 22 has a hole 22a recessed downward from the upper surface of the rotor core 22. In the present embodiment, the hole 22a is a through-hole penetrating the rotor core 22 in the axial direction. As illustrated in FIG. 2, a plurality of the holes 22a are provided at intervals along the circumferential direction in the present embodiment. The plurality of holes 22a are arranged at regular intervals over the whole circumference in the circumferential direction. For example, twenty holes 22a are provided. The number of the holes 22a is, for example, the same as the number of poles of the rotor 20.

Figure 4:
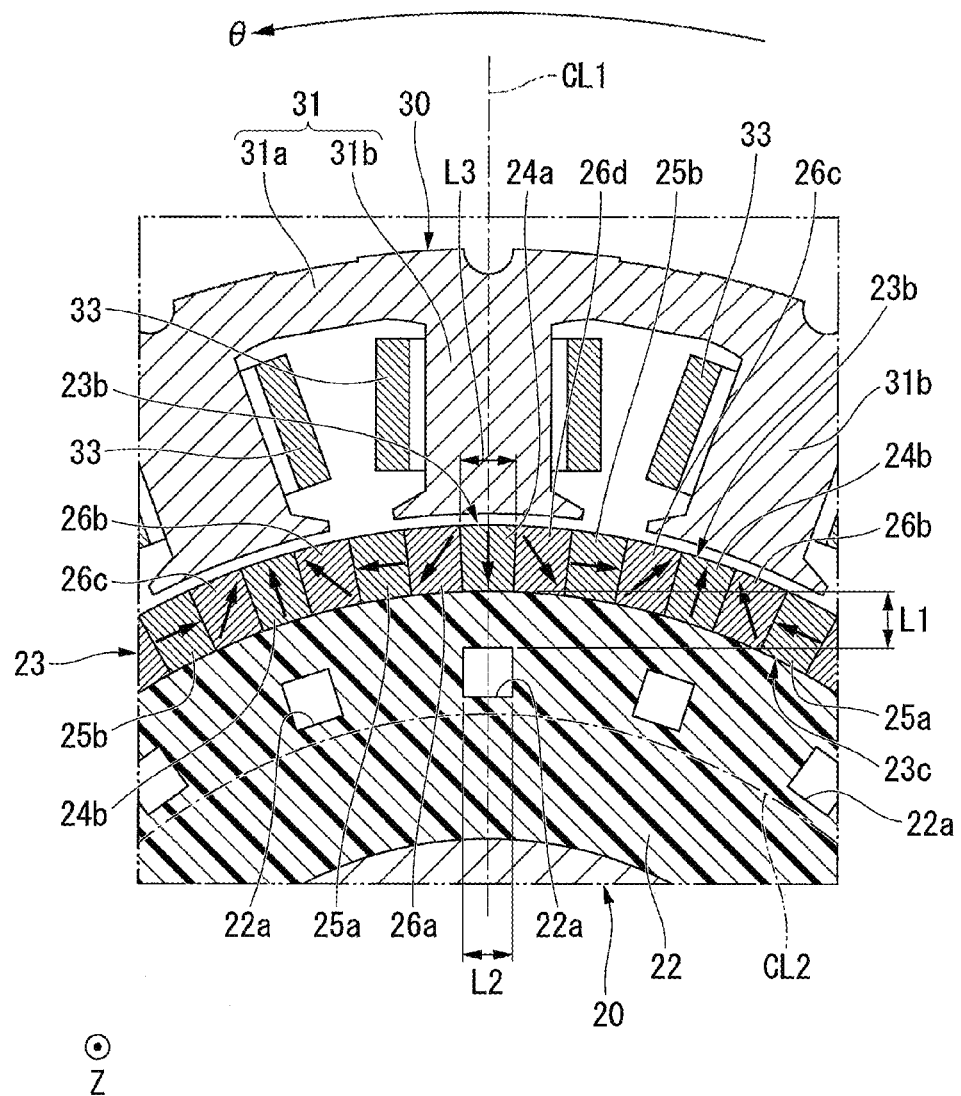
FIG. 4 is a cross-sectional view illustrating the rotor and the stator of the present embodiment, and is a partially enlarged view in FIG. 2.

As illustrated in FIG. 4, the hole 22a has a line-symmetrical shape with respect to a circumferential center line CL1 when viewed along the axial direction. The circumferential center line CL1 is a virtual line passing through a circumferential center of a radially magnetized portion 23b, which will be described below, when viewed along the axial direction. The hole 22a has, for example, a square shape when viewed along the axial direction.

The hole 22a is located at a position separated radially inward from an outer peripheral surface of the rotor core 22. The hole 22a is provided in a portion of the rotor core 22 close to the radially outer side. The hole 22a is located on the radially outer side of a radial center line CL2. The radial center line CL2 is a virtual line passing through a radial center between an inner peripheral surface of the rotor core 22 and the outer peripheral surface of the rotor core 22 when viewed along the axial direction. The radial center line CL2 has an annular shape centered on the central axis J. In the present embodiment, the hole 22a is provided in the portion close to the radially inner side, in the portion of the rotor core 22 located on the radially outer side of the radial center line CL2.

A radial distance L1 from the outer peripheral surface of the rotor core 22 to a radially outer end of the hole 22a is smaller than a radial distance from the inner peripheral surface of the rotor core 22 to a radially inner end of the hole 22a. The distance L1 is larger than a radial distance from the radial center line CL2 to the radially inner end of the hole 22a. In the present embodiment, the distance L1 is 1 mm or more and 5 mm or less. For example, the distance L1 is more preferably 1.5 mm or more and 3 mm or less and still more preferably 2 mm. By setting the distance L1 within such a numerical range, a first magnetic member 73 can be suitably magnetized in a magnetization step S2 as described below.

A circumferential dimension L2 of the hole 22a is equal to or smaller than a circumferential dimension L3 of the radially magnetized portion 23b as described below. In the present embodiment, the dimension L2 is substantially the same as the dimension L3. In the present embodiment, the circumferential dimension L2 of the hole 22a is, for example, the same in any portion of the hole 22a in the radial direction.

The rotor magnet 23 is fixed to the outer peripheral surface of the rotor core 22. As illustrated in FIG. 2, the rotor magnet 23 has a tubular shape surrounding the rotor core 22. The rotor magnet 23 has, for example, a cylindrical shape that extends in the axial direction with the central axis J as the center and is open on both sides in the axial direction. An inner peripheral surface of the rotor magnet 23 is fixed to an outer peripheral surface of the rotor core 22 with, for example, an adhesive or the like. As illustrated in FIG. 1, a lower end of the rotor magnet 23 is located below a lower end of the rotor core 22 and a lower end of the stator core 31 in the present embodiment. In the present embodiment, an upper end of the rotor magnet 23 is located at the same position in the axial direction as an upper end of the rotor core 22.

As illustrated in FIGS. 2 and 3, the rotor magnet 23 includes a plurality of magnetized portions 23a. In the present embodiment, each of the plurality of magnetized portions 23a is a single member and is a separate magnet. The rotor magnet 23 is configured by connecting the plurality of magnetized portions 23a along the circumferential direction. As illustrated in FIG. 3, the plurality of magnetized portions 23a have, for example, a quadrangular prism shape extending in the axial direction. Each of the magnetized portions 23a is configured by, for example, connecting two magnets in the axial direction. A circumferential dimension of the magnetized portion 23a is smaller than a circumferential dimension of the tooth 31b. In the present embodiment, four or five magnetized portions 23a can simultaneously face one tooth 31b in the radial direction. For example, eighty magnetized portions 23a are provided. Materials of the plurality of magnetized portions 23a are, for example, the same as each other. The materials of the plurality of magnetized portions 23a may be different from each other.

The plurality of magnetized portions 23a are arranged along the circumferential direction in a Halbach array for increasing the magnetic field intensity on the radially outer side. The plurality of magnetized portions 23a include a plurality of radially magnetized portions 23b and a plurality of non-radially magnetized portions 23c. The radially magnetized portion 23b is the magnetized portion 23a whose magnetization direction is the radial direction. The non-radially magnetized portion 23c is the magnetized portion 23a whose magnetization direction is different from the radial direction.

In FIGS. 3 and 4, the magnetization directions of the magnetized portions 23a are virtually indicated by arrows on upper end surfaces of the magnetized portions 23a. The direction of the virtually indicated arrow indicates a direction from an S pole to an N pole in the magnetized portion 23a. That is, magnetic poles of the magnetized portion 23a are set such that a side on which the virtually indicated arrow faces is the N pole and a side opposite to the side on which the virtually indicated arrow faces is the S pole. In the following description, the direction of the virtually indicated arrow, that is, the direction from the S pole to the N pole in the magnetized portion 23a is simply referred to as a "direction of a magnetization direction".

The radially magnetized portion 23b includes a first radially magnetized portion 24a and a second radially magnetized portion 24b. A direction of a magnetization direction of the first radially magnetized portion 24a is a radially inward direction. That is, magnetic poles of the first radially magnetized portion 24a are set such that the radially inner side is an N pole and the radially outer side is an S pole. A direction of a magnetization direction of the second radially magnetized portion 24b is a radially outward direction. That is, magnetic poles of the second radially magnetized portion 24b are set such that the radially outer side is an N pole and the radially inner side is an S pole. In the second radially magnetized portion 24b, the magnetic poles on both the sides in the radial direction are arranged opposite to those of the first radially magnetized portion 24a.

The first radially magnetized portions 24a and the second radially magnetized portions 24b are alternately arranged along the circumferential direction with at least one of non-radially magnetized portions 23c interposed therebetween. In the present embodiment, the first radially magnetized portions 24a and the second radially magnetized portions 24b are alternately arranged along the circumferential direction with three non-radially magnetized portion 23c interposed therebetween. As a result, the plurality of radially magnetized portions 23b are arranged at intervals along the circumferential direction.

As illustrated in FIG. 4, a first radially magnetized portion 24a and a second radially magnetized portion 24b are fixed to outer peripheral surfaces of the portions of the rotor core 22 located radially outside the holes 22a. That is, the plurality of holes 22a are located on the radially inner side of the plurality of radially magnetized portions 23b, respectively, in the present embodiment.

The circumferential dimension L3 of the radially magnetized portion 23b slightly increases from the radially inner side toward the radially outer side. The circumferential dimension L3 at a radially inner end of the radially magnetized portion 23b is, for example, the same as the circumferential dimension L2 of the hole 22a. The circumferential dimension L3 at a radially outer end of the radially magnetized portion 23b is, for example, larger than the circumferential dimension L2 of the hole 22a.

In the present specification, an expression "a circumferential dimension of a hole is equal to or smaller than a circumferential dimension of a radially magnetized portion" may mean that a maximum value of circumferential dimensions of the hole is equal to or smaller than a maximum value of circumferential dimensions of the radially magnetized portion. That is, in the present embodiment, the expression "the circumferential dimension L2 of the hole 22a is equal to or smaller than the circumferential dimension L3 of the radially magnetized portion 23b" may mean that the circumferential dimension L2 of the hole 22a is equal to or smaller than the circumferential dimension L3 at the radially outer end of the radially magnetized portion 23b.

Edges on both sides in the circumferential direction at the radially inner end of the radially magnetized portion 23b are located at the same position in the circumferential direction as edges on both sides in the circumferential direction at the radially outer end of the hole 22a, for example.

The non-radially magnetized portion 23c includes first non-radially magnetized portions 25a and 25b and second non-radially magnetized portions 26a, 26b, 26c, and 26d. Magnetization directions of the first non-radially magnetized portions 25a and 25b are the circumferential direction. That is, the first non-radially magnetized portions 25a and 25b correspond to circumferentially magnetized portions in the present embodiment. A direction of the magnetization direction of the first non-radially magnetized portion 25a is a direction toward one side (+θ side) in the circumferential direction. That is, magnetic poles of the first non-radially magnetized portion 25a are set such that the one side in the circumferential direction is an N pole and the other side (−θ side) in the circumferential direction is an S pole. A direction of the magnetization direction of the first non-radially magnetized portion 25b is a direction toward the other side in the circumferential direction. That is, magnetic poles of the first non-radially magnetized portion 25b are set such that the other side in the circumferential direction is an N pole and the one side in the circumferential direction is an S pole. In the first non-radially magnetized portion 25b, the magnetic poles on both the sides in the circumferential direction are arranged opposite to those of the first non-radially magnetized portion 25a.

Each of the first non-radially magnetized portions 25a and 25b is located between the first radially magnetized portion 24a and the second radially magnetized portion 24b in the circumferential direction. That is, the first non-radially magnetized portions 25a and 25b as the plurality of circumferentially magnetized portions are located between the radially magnetized portions 23b adjacent to each other in the circumferential direction. The first non-radially magnetized portions 25a and the first non-radially magnetized portions 25b are alternately arranged along the circumferential direction with any one of the first radially magnetized portion 24a and the second radially magnetized portion 24b interposed therebetween. The first non-radially magnetized portion 25a is located on one side (+θ side) in the circumferential direction of the first radially magnetized portion 24a and is located on the other side (−θ side) in the circumferential direction of the second radially magnetized portion 24b between the first radially magnetized portion 24a and the second radially magnetized portion 24b in the circumferential direction. The first non-radially magnetized portion 25b is located on the other side in the circumferential direction of the first radially magnetized portion 24a and is located on the one side in the circumferential direction of the second radially magnetized portion 24b between the first radially magnetized portion 24a and the second radially magnetized portion 24b in the circumferential direction.

The N poles of the first non-radially magnetized portions 25a and 25b are arranged on a side where the second radially magnetized portion 24b is located, between the first radially magnetized portion 24a and the second radially magnetized portion 24b in the circumferential direction. The S poles of the first non-radially magnetized portions 25a and 25b are arranged on a side where the first radially magnetized portion 24a is located, between the first radially magnetized portion 24a and the second radially magnetized portion 24b in the circumferential direction.

Each of the first non-radially magnetized portions 25a and 25b is fixed to an outer peripheral surface of a portion between the holes 22a whose circumferential positions are adjacent in the rotor core 22. That is, all the holes 22a are located at positions different from the first non-radially magnetized portions 25a and 25b, which are the circumferentially magnetized portions, in the circumferential direction in the present embodiment.

Magnetization directions of the second non-radially magnetized portions 26a, 26b, 26c, and 26d are directions intersecting both the radial direction and the circumferential direction. The magnetization directions of the second non-radially magnetized portions 26a, 26b, 26c, and 26d are orthogonal to the axial direction. In the present embodiment, the magnetization directions of the second non-radially magnetized portions 26a, 26b, 26c, and 26d are directions inclined by 45° in the circumferential direction with respect to the radial direction. The magnetization directions of the second non-radially magnetized portions 26a and 26c are directions located on one side (+θ side) in the circumferential direction as proceeding to the radially inner side. The magnetization directions of the second non-radially magnetized portions 26b and 26d are directions located on the other side (−θ side) in the circumferential direction as proceeding to the radially inner side.

In the present embodiment, directions of the magnetization directions of the second non-radially magnetized portions 26a, 26b, 26c, and 26d are directions each of which is inclined by 45° toward the direction of the magnetization direction of the magnetized portion 23a adjacent on the other side (−θ side) in the circumferential direction with respect to the direction of the magnetization direction of the magnetized portion 23a adjacent on one side (+θ side) in the circumferential direction.

The direction of the magnetization direction of the second non-radially magnetized portion 26a is a direction toward one side (+θ side) in the circumferential direction that is inclined radially inward. That is, the second non-radially magnetized portion 26a has an N pole on the radially inner side and the one side in the circumferential direction and an S pole on the radially outer side and the other side (−θ side) in the circumferential direction. The direction of the magnetization direction of the second non-radially magnetized portion 26b is a direction toward one side in the circumferential direction that is inclined radially outward. That is, the second non-radially magnetized portion 26b has an N pole on the radially outer side and the one side in the circumferential direction and an S pole on the radially inner side and the other side in the circumferential direction. The direction of the magnetization direction of the second non-radially magnetized portion 26c is a direction toward the other side in the circumferential direction that is inclined radially outward. That is, the second non-radially magnetized portion 26c has an N pole on the radially outer side and the other side in the circumferential direction and an S pole on the radially inner side and the one side in the circumferential direction. The direction of the magnetization direction of the second non-radially magnetized portion 26d is a direction toward the other side in the circumferential direction that is inclined radially inward. That is, the second non-radially magnetized portion 26d has an N pole on the radially inner side and the other side in the circumferential direction and an S pole on the radially outer side and the one side in the circumferential direction.

The second non-radially magnetized portions 26a and 26b are arranged adjacent to each other on both the sides in the circumferential direction of the first non-radially magnetized portion 25a. The second non-radially magnetized portions 26c and 26d are arranged adjacent to each other on both the sides in the circumferential direction of the first non-radially magnetized portion 25b. The second non-radially magnetized portions 26a and 26d are arranged adjacent to each other on both the sides in the circumferential direction of the first radially magnetized portion 24a. The second non-radially magnetized portions 26b and 26c are arranged adjacent to each other on both the sides in the circumferential direction of the second radially magnetized portion 24b.

The second non-radially magnetized portion 26a is located between the first radially magnetized portion 24a and the first non-radially magnetized portion 25a in the circumferential direction. The second non-radially magnetized portion 26b is located between the second radially magnetized portion 24b and the first non-radially magnetized portion 25a in the circumferential direction. The second non-radially magnetized portion 26c is located between the second radially magnetized portion 24b and the first non-radially magnetized portion 25b in the circumferential direction. The second non-radially magnetized portion 26d is located between the first radially magnetized portion 24a and the first non-radially magnetized portion 25b in the circumferential direction. In this manner, each of the second non-radially magnetized portions 26a, 26b, 26c, and 26d is located between the radially magnetized portion 23b and each of the first non-radially magnetized portions 25a and 25b in the circumferential direction.

In the rotor magnet 23, a plurality of array patterns in which the plurality of magnetized portions 23a are arrayed along the circumferential direction are continuously formed over the entire circumference. The array patterns of the magnetized portions 23a forming the rotor magnet 23 are array patterns in which the first radially magnetized portions 24a, the second non-radially magnetized portion 26a, the first non-radially magnetized portion 25a, the second non-radially magnetized portion 26b, the second radially magnetized portion 24b, the second non-radially magnetized portion 26c, the first non-radially magnetized portion 25b, and the second non-radially magnetized portions 26d are arrayed in this order toward the one side in the circumferential direction. As a result, the rotor magnet 23 has the Halbach array in which the magnetic field intensity on the radially outer side is increased. Therefore, the magnetic force generated between the rotor 20 and the stator 30 can be increased, and the output of the motor 10 can be improved.

As illustrated in FIG. 3, an axial dimension of the radially magnetized portion 23b, axial dimensions of the first non-radially magnetized portions 25a and 25b, and axial dimensions of the second non-radially magnetized portions 26a, 26b, 26c, and 26d are the same in the present embodiment. An upper end of the radially magnetized portion 23b, upper ends of the first non-radially magnetized portions 25a and 25b, and upper ends of the second non-radially magnetized portions 26a, 26b, 26c, and 26d are located at the same position in the axial direction, for example. A lower end of the radially magnetized portion 23b, lower ends of the first non-radially magnetized portions 25a and 25b, and lower ends of the second non-radially magnetized portions 26a, 26b, 26c, and 26d are located at the same position in the axial direction, for example. The circumferential dimension L3 of the radially magnetized portion 23b, circumferential dimensions of the first non-radially magnetized portions 25a and 25b, and circumferential dimensions of the second non-radially magnetized portions 26a, 26b, 26c, and 26d are the same, for example.

As illustrated in FIG. 1, the first bearing 71 and the second bearing 72 support the rotor 20 rotatably. The first bearing 71 and the second bearing 72 are, for example, ball bearings. The propeller mounting portion 80 is a portion on which the propeller 2 is mounted. The propeller mounting portion 80 is fixed to an upper end of the shaft 21. The propeller mounting portion 80 is located outside the housing 40.

The sensor assembly 50 is located below the rotor core 22. The sensor assembly 50 includes a sensor holder 51, a circuit board 53, and a magnetic sensor 52. That is, the motor 10 includes the sensor holder 51, the circuit board 53, and the magnetic sensor 52.

The circuit board 53 is fixed to the sensor holder 51. The circuit board 53 has a plate shape whose plate surface is directed in the axial direction. The magnetic sensor 52 is located above the circuit board 53. The magnetic sensor 52 has a terminal extending downward. The terminal of the magnetic sensor 52 is connected to an upper surface of the circuit board 53. As a result, the magnetic sensor 52 is electrically connected to the circuit board 53. The magnetic sensor 52 is held by the sensor holder 51. The magnetic sensor 52 is located below the rotor core 22.

The magnetic sensor 52 is located on the radially inner side of the rotor magnet 23. In the present embodiment, the magnetic sensor 52 is located on the radially inner side of the lower end of the rotor magnet 23. Here, the lower end of the rotor magnet 23 is located below the lower end of the rotor core 22 in the present embodiment. Therefore, the magnetic sensor 52 can be easily arranged on the radially inner side of the lower end of the rotor magnet 23. In the present embodiment, an upper portion of the magnetic sensor 52 is located on the radially inner side of the lower end of the rotor magnet 23. The magnetic sensor 52 faces the lower end of the rotor magnet 23 in the radial direction with a gap interposed therebetween.

The magnetic sensor 52 can detect a magnetic field of the rotor magnet 23. In the present embodiment, the magnetic sensor 52 can detect the magnetic field of the lower end of the rotor magnet 23 that faces the magnetic sensor 52 in the radial direction. That is, an axial portion of the rotor magnet 23 where the magnetic field in the present embodiment is detected by the magnetic sensor 52 is the lower end of the rotor magnet 23.

The "portion of the rotor magnet where the magnetic field is detected by the magnetic sensor" in the present specification includes a portion of the rotor magnet whose axial position is the same as an axial position of the magnetic sensor in a case where at least a part of the magnetic sensor is arranged at the same axial position as a part of the rotor magnet. That is, the lower end of the rotor magnet 23 in the present embodiment has the same axial position as the upper portion of the magnetic sensor 52, and is included in the portion where the magnetic field is detected by the magnetic sensor 52.

The "portion of the rotor magnet where the magnetic field is detected by the magnetic sensor" in the present specification includes an axial end of the rotor magnet on a side close to the magnetic sensor in a case where the magnetic sensor is located above or below the rotor magnet. That is, in a case where the magnetic sensor 52 is located, for example, below the rotor magnet 23, a lower end, close to the magnetic sensor 52 between axial ends of the rotor magnet 23, is included in the portion where the magnetic field is detected by the magnetic sensor 52.

The magnetic sensor 52 in the present embodiment is, for example, a Hall element such as a Hall IC. Although not illustrated, a plurality of the magnetic sensors 52 are provided along the circumferential direction. The rotation of the rotor 20 can be detected by detecting the magnetic field of the rotor magnet 23 with the magnetic sensor 52. The rotation of the rotor 20 may be detected by the magnetic sensor 52 itself, or may be detected by another portion based on a detection result of the magnetic sensor 52. The other portion is, for example, a control unit (not illustrated) provided on the circuit board 53. In this manner, the rotation of the rotor 20 can be detected using the magnetic field of the rotor magnet 23 without separately providing a magnet, configured for detection with the magnetic sensor 52, in addition to the rotor magnet 23 according to the present embodiment. Therefore, the number of components of the motor 10 can be reduced. It is unnecessary to consider the mounting accuracy of the separately provided magnet, and the assembly of the motor 10 can be facilitated.

Figure 5:
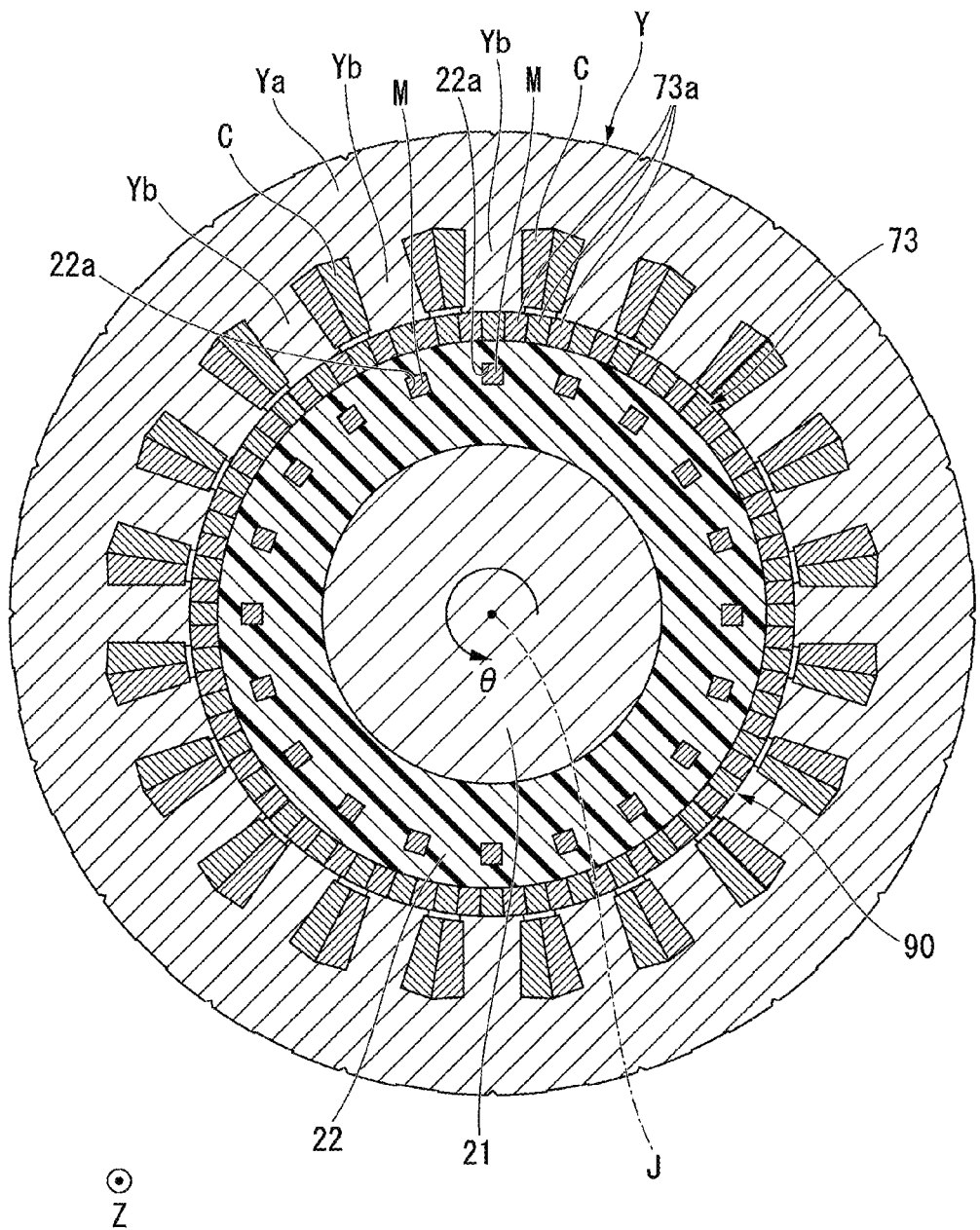
FIG. 5 is a cross-sectional view illustrating a part of a procedure of a method of manufacturing the rotor of the present embodiment.

The above-described method of manufacturing the motor 10 includes a method of manufacturing the rotor 20. In the present embodiment, the method of manufacturing the rotor 20 includes a fixing step S1 and a magnetization step S2. The fixing step S1 is a step of fixing the first magnetic member 73 to the rotor core 22. The first magnetic member 73 is a member that is magnetized to serve as the rotor magnet 23. That is, the first magnetic member 73 is the rotor magnet 23 before being magnetized, and is not magnetic. A shape of the first magnetic member 73 is the same as a shape of the rotor magnet 23. As illustrated in FIG. 5, the first magnetic member 73 has an annular shape surrounding the rotor core 22.

Figure 6:
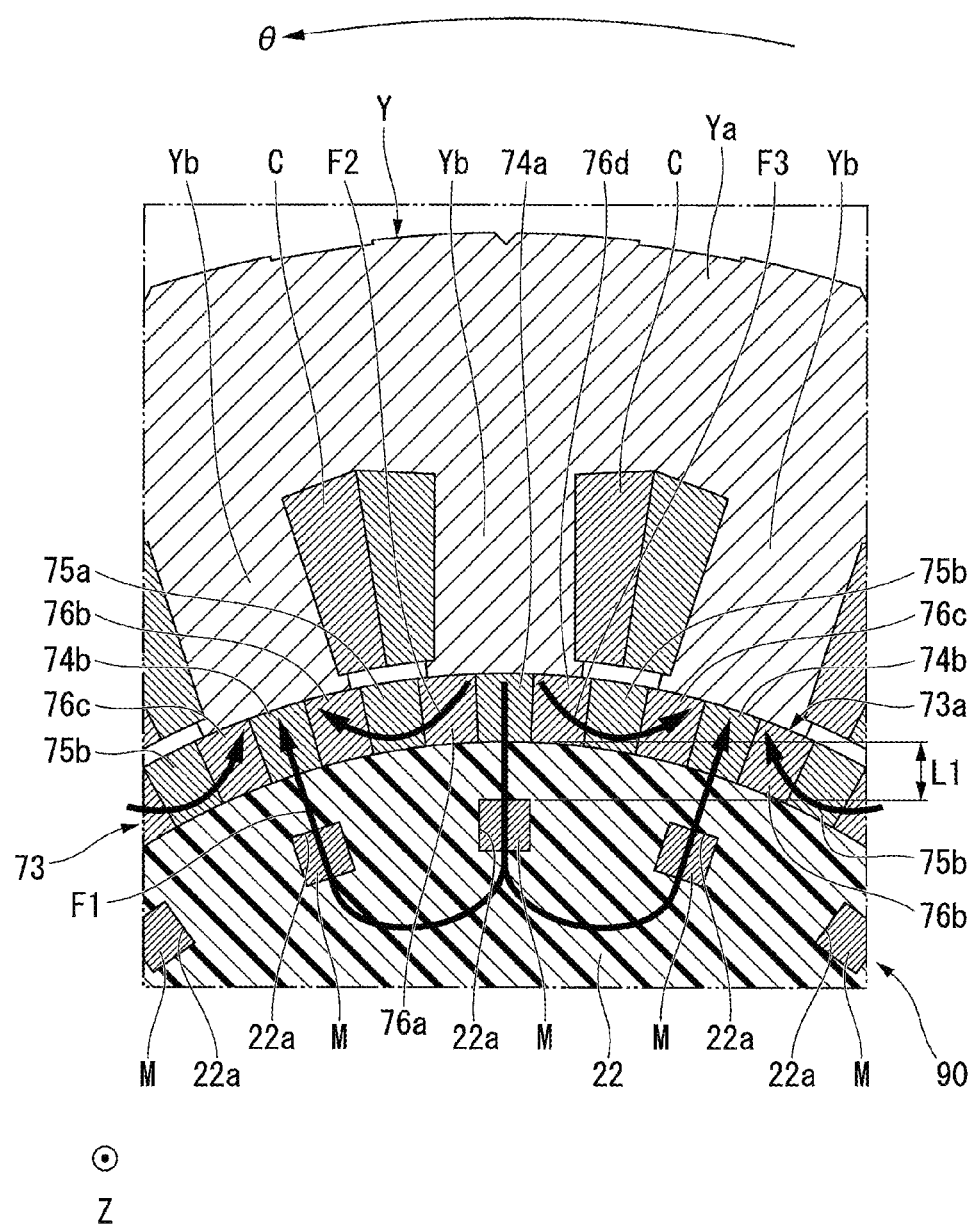
FIG. 6 is a cross-sectional view illustrating a part of the procedure of the method of manufacturing the rotor of the present embodiment, and is a partially enlarged view in FIG. 5.

The first magnetic member 73 is configured by connecting a plurality of first magnetic member pieces 73a in the circumferential direction. The plurality of first magnetic member pieces 73a are members which are magnetized to serve as the plurality of magnetized portions 23a, respectively. That is, the first magnetic member piece 73a is the magnetized portion 23a before being magnetized, and is not magnetic. A shape of the first magnetic member piece 73a is the same as a shape of the magnetized portion 23a. As illustrated in FIG. 6, the first magnetic member piece 73a includes first pieces 74a and 74b, second pieces 75a and 75b, and third pieces 76a, 76b, 76c, and 76d.

The first piece 74a is a member that is magnetized to serve as the first radially magnetized portion 24a. The first piece 74b is a member that is magnetized to serve as the second radially magnetized portion 24b. The second piece 75a is a member that is magnetized to serve as the first non-radially magnetized portion 25a. The second piece 75b is a member that is magnetized to serve as the first non-radially magnetized portion 25b. The third piece 76a is a member that is magnetized to serve as the second non-radially magnetized portion 26a. The third piece 76b is a member that is magnetized to serve as the second non-radially magnetized portion 26b. The third piece 76c is a member that is magnetized to serve as the second non-radially magnetized portion 26c. The third piece 76d is a member that is magnetized to serve as the second non-radially magnetized portion 26d.

In the present embodiment, the first magnetic member 73 has magnetic anisotropy. An easy magnetization direction of the first magnetic member 73 is different for each of the first magnetic member pieces 73a constituting the first magnetic member 73. An easy magnetization direction of the first magnetic member piece 73a is the same direction as the magnetization direction of the magnetized portion 23a formed by magnetizing each of the first magnetic member pieces 73a. An easy magnetization direction of the first pieces 74a and 74b is the radial direction. An easy magnetization direction of the second pieces 75a and 75b is the circumferential direction. An easy magnetization direction of the third pieces 76a and 76c is a direction located on the one side (+θ side) in the circumferential direction as proceeding to the radially inner side. An easy magnetization direction of the third pieces 76b and 76d is a direction located on the other side (−θ side) in the circumferential direction as proceeding to the radially inner side.

In the fixing step S1, the worker or the like fixes the plurality of first magnetic member pieces 73a to the outer peripheral surface of the rotor core 22 with, for example, an adhesive or the like, to fix the first magnetic member 73 to the rotor core 22. At this time, the respective first magnetic member pieces 73a are not magnetized and are not magnetic, and thus, do not repel each other. Therefore, the plurality of first magnetic member pieces 73a can be easily fixed to the rotor core 22.

In the present specification, the term "worker or the like" includes a worker who performs each work, a device, and the like. Each work may be performed only by a worker, may be performed only by a device, or may be performed by a worker and a device.

In the present embodiment, the first magnetic member 73 has magnetic anisotropy. Therefore, in the fixing step S1, the worker or the like fixes the first magnetic member 73 to the rotor core 22 in accordance with the magnetization direction in which magnetization is performed in the magnetization step S2. In the fixing step S1 of the present embodiment, the worker or the like positions the rotor core 22 in the circumferential direction using the hole 22a. As a result, the worker or the like can fix the first magnetic member 73 to the rotor core 22 with high positional accuracy in accordance with the magnetization direction in which magnetization is performed in the magnetization step S2. Specifically, the worker or the like positions the rotor core 22 in the circumferential direction by inserting a jig into the hole 22a or the like.

In the fixing step S1, the worker or the like fixes each of the first magnetic member pieces 73a to the outer peripheral surface of the rotor core 22 in accordance with the magnetization direction when the respective first magnetic member pieces 73a serve as the magnetized portions 23a. In the fixing step S1, the worker or the like fixes the first piece 74a, which serves as the first radially magnetized portion 24a, and the first piece 74b, which serves as the second radially magnetized portion 24b, to the outer peripheral surfaces of the portions of the rotor core 22 located radially outside the holes 22a. As a result, each of the first pieces 74a and 74b is located radially outside the hole 22a. That is, among the plurality of first magnetic member pieces 73a, the first magnetic member pieces 73a located radially outside the holes 22a are the first pieces 74a and 74b which are magnetized in the magnetization step S2 to serve as the radially magnetized portions 23b.

In the fixing step S1, the rotor core 22 may be fixed to the shaft 21 or is not necessarily fixed to the shaft 21. When the rotor core 22 is not fixed to the shaft 21 in the fixing step S1, the worker or the like fixes the rotor core 22 to the shaft 21 after the fixing step S1. In the following description, it is assumed that the rotor core 22 is fixed to the shaft 21 before the fixing step S1.

The magnetization step S2 is a step of magnetizing the first magnetic member 73 fixed to the outer peripheral surface of the rotor core 22 to form the rotor magnet 23. The magnetization of the first magnetic member 73 in the magnetization step S2 of the present embodiment is performed using a magnetizing yoke Y illustrated in FIG. 5. The magnetizing yoke Y includes an annular core back portion Ya and a plurality of tooth portions Yb extending radially inward from the core back portion Ya. The plurality of tooth portions Yb are arranged along the circumferential direction. More specifically, the plurality of tooth portions Yb are arranged at regular intervals along the circumferential direction over the entire circumference. The number of the tooth portions Yb is the same as the number of teeth 31b of the stator 30. A magnetizing coil C is attached to each of the tooth portions Yb.

As illustrated in FIG. 5, the worker or the like arranges an assembly 90 in which the first magnetic member 73 is fixed to the rotor core 22 inside the magnetizing yoke Y in the magnetization step S2. As a result, the magnetizing yoke Y is located radially outside the first magnetic member 73, and the core back portion Ya surrounds the first magnetic member 73. In the state of being arranged inside the magnetizing yoke Y, for example, a radially inner end surface of the tooth portion Yb is in contact with an outer peripheral surface of the first magnetic member 73. A gap may be provided between the outer peripheral surface of the first magnetic member 73 and the radially inner end surface of the tooth portion Yb.

When arranging the assembly 90 inside the magnetizing yoke Y, the worker or the like positions the rotor core 22 and the first magnetic member 73 in the circumferential direction with respect to the magnetizing yoke Y. In the magnetization step S2 of the present embodiment, the worker or the like positions the rotor core 22 and the first magnetic member 73 in the circumferential direction using the holes 22a. More specifically, the worker or the like inserts a second magnetic member M made of a magnetic material into the hole 22a and uses the second magnetic member M to position the rotor core 22 and the first magnetic member 73 in the circumferential direction.

In the present embodiment, the second magnetic member M is a quadrangular prism member extending in the axial direction. Although not illustrated, an axial dimension of the second magnetic member M is equal to or larger than an axial dimension of the hole 22a. A shape of a portion of the second magnetic member M inserted into the hole 22a is substantially the same as an internal shape of the hole 22a. The second magnetic member M is inserted into each of the holes 22a. In the present embodiment, the second magnetic member M is fitted into the hole 22a and fills the entire inside of the hole 22a.

The worker or the like adjusts circumferential positions of the rotor core 22 and the first magnetic member 73 using the holes 22a and the second magnetic members M, and arranges each of the holes 22a on the radially inner side of each of the tooth portions Yb. That is, in the magnetization step S2, the worker or the like positions the rotor core 22 and the first magnetic member 73 at a position where the hole 22a is located on the radially inner side of the tooth portion Yb.

Here, the first piece 74a or the first piece 74b is fixed to the outer peripheral surface of the portion of the rotor core 22 located on the radially outer side of the hole 22a in the present embodiment. Therefore, the first piece 74a or the first piece 74b is located on the radially inner side of the tooth portion Yb as illustrated in FIG. 6. In the present embodiment, the radially outer surfaces of the first pieces 74a and 74b are in contact with radially inner end surfaces of the tooth portions Yb. In the present embodiment, radially outer surfaces of the third pieces 76a and 76d adjacent to both sides of the first piece 74a in the circumferential direction and radially outer surfaces of the third pieces 76b and 76c adjacent to both sides of the first piece 74b in the circumferential direction are also in contact with the radially inner end surfaces of the tooth portions Yb.

Next, the worker or the like applies a current to the magnetizing coil C attached to the tooth portion Yb of the magnetizing yoke Y to generate a magnetic field. As a result, the worker or the like magnetizes the first magnetic member 73. At this time, the second magnetic member M used for positioning is kept inserted into the hole 22a. That is, in the magnetization step S2, the worker or the like magnetizes the first magnetic member 73 in the state where the second magnetic member M is inserted into the hole 22a. Therefore, the first magnetic member 73 can be magnetized in a state where the hole 22a is filled with the second magnetic member M made of the magnetic material. As a result, a magnetic flux can be attracted by the second magnetic member M, and the magnetic flux can easily suitably flow to the first magnetic member 73 during magnetization. Therefore, the first magnetic member 73 is easily magnetized even if the hole 22a is provided in the rotor core 22 according to the present embodiment.

According to the present embodiment, the rotor core 22 and the first magnetic member 73 can be positioned in the circumferential direction using the hole 22a in the magnetization step S2. Therefore, the circumferential position of the first magnetic member 73 can be accurately determined with respect to the magnetizing yoke Y, and the first magnetic member 73 can be more suitably magnetized.

In particular, when the rotor core 22 and the first magnetic member 73 are positioned by using the insertion of the second magnetic member M into the hole 22a as in the present embodiment, the number of steps required for the magnetization step S2 can be reduced as compared with a case where the positioning of the rotor core 22 and the first magnetic member 73 and the insertion of the second magnetic member M are separately performed.

According to the present embodiment, the rotor core 22 and the first magnetic member 73 are positioned at a position where the hole 22a is located on the radially inner side of the tooth portion Yb in the magnetization step S2. Therefore, the magnetic flux flowing in the radial direction between the tooth portion Yb and the first magnetic member 73 can be easily guided by the second magnetic member M inserted into the hole 22a, and the magnetic flux can more suitably flow to the first magnetic member 73. Therefore, the first magnetic member 73 is more easily magnetized.

As indicated by arrows in FIG. 6, the magnetic flux flowing from the tooth portion Yb to the first magnetic member 73 in the magnetization step S2 of the present embodiment includes a first magnetic flux F1, a second magnetic flux F2, and a third magnetic flux F3. The first magnetic flux F1 flows radially inward from the tooth portion Yb and passes through the first magnetic member 73, a part of the rotor core 22, and the second magnetic member M inserted into the hole 22a. The first magnetic flux F1 having passed through the second magnetic member M in the radial direction branches to both sides in the circumferential direction and passes through the second magnetic member M adjacent to the passed second magnetic member M in the circumferential direction to enter the tooth portion Yb adjacent to the tooth portion Yb from which the first magnetic flux F1 has been released in the circumferential direction.

In the present embodiment, the first magnetic flux F1 passes through the first pieces 74a and 74b in the radial direction. Therefore, the first piece 74a can be suitably magnetized by the first magnetic flux F1 to serve as the first radially magnetized portion 24a, and the first piece 74b can be suitably magnetized to serve as the second radially magnetized portion 24b.

The second magnetic flux F2 flows from the radially inner end surface of the tooth portion Yb to the one side (+θ side) in the circumferential direction, passes through the first magnetic member 73, and enters the tooth portion Yb adjacent to the one side in the circumferential direction. In the present embodiment, the second magnetic flux F2 passes through the third piece 76a, the second piece 75a, and the third piece 76b in this order. The flow of the second magnetic flux F2 is curved radially inward.

Therefore, a direction of the second magnetic flux F2 passing through the inside of the third piece 76a tends to be a direction located radially inward as proceeding toward the one side (+θ side) in the circumferential direction. As a result, the third piece 76a can be suitably magnetized to serve as the second non-radially magnetized portion 26a. The direction of the second magnetic flux F2 passing through the second piece 75a tends to be the direction toward the one side in the circumferential direction. As a result, the second piece 75a can be suitably magnetized to serve as the first non-radially magnetized portion 25a. A direction of the second magnetic flux F2 passing through the inside of the third piece 76b tends to be a direction located radially outward as proceeding toward the one side in the circumferential direction. As a result, the third piece 76b can be suitably magnetized to serve as the second non-radially magnetized portion 26b.

The third magnetic flux F3 flows from the radially inner end surface of the tooth portion Yb to the other side (−θ side) in the circumferential direction, passes through the first magnetic member 73, and enters the tooth portion Yb adjacent to the other side in the circumferential direction. In the present embodiment, the third magnetic flux F3 passes through the third piece 76d, the second piece 75b, and the third piece 76c in this order. The flow of the third magnetic flux F3 is curved radially inward.

Therefore, a direction of the third magnetic flux F3 passing through the inside of the third piece 76d tends to be a direction located radially inward as proceeding toward the other side (−θ side) in the circumferential direction. As a result, the third piece 76d can be suitably magnetized to serve as the second non-radially magnetized portion 26d. The direction of the third magnetic flux F3 passing through the second piece 75b tends to be the direction toward the other side in the circumferential direction. As a result, the second piece 75b can be suitably magnetized to serve as the first non-radially magnetized portion 25b. A direction of the third magnetic flux F3 passing through the inside of the third piece 76c tends to be a direction located radially outward as proceeding toward the other side in the circumferential direction. As a result, the third piece 76c can be suitably magnetized to serve as the second non-radially magnetized portion 26c.

Each of the first magnetic member pieces 73a of the first magnetic member 73 can be made to serve as the magnetized portions 23a arranged along the circumferential direction in the Halbach array by performing the magnetization step S2 as described above. As a result, the rotor magnet 23 is formed. After completion of the magnetization step S2, the worker or the like extracts the second magnetic member M inserted into the hole 22a, and extracts the rotor core 22 and the rotor magnet 23 from the inside of the magnetizing yoke Y. As a result, the rotor 20 is manufactured.

For example, considered is a case where the first magnetic member 73 is magnetized in the same manner as the magnetization step S2 described above when a rotor core is a magnetic member made of a magnetic material. In this case, the magnetic flux from the tooth portion Yb easily flows to the rotor core since the rotor core is the magnetic member. As a result, the amount of the first magnetic flux F1 increases while the amount of the second magnetic flux F2 and the amount of the third magnetic flux F3 decrease. Therefore, the second pieces 75a and 75b and the third pieces 76a, 76b, 76c, and 76d through which the second magnetic flux F2 or the third magnetic flux F3 passes are less likely to be magnetized. Therefore, there is a possibility that the rotor magnet formed by magnetizing the first magnetic member 73 does not form the Halbach array or forms a Halbach array in which it is difficult to sufficiently increase the magnetic field intensity.

On the other hand, the rotor core 22 is the non-magnetic member made of the non-magnetic material according to the present embodiment. Therefore, the magnetic flux easily passes through the inside of the first magnetic member 73, and the magnetic flux from the tooth portion Yb easily flows to both the sides in the circumferential direction as compared with the case where the rotor core 22 is the magnetic member. As a result, the amount of the second magnetic flux F2 and the amount of the third magnetic flux F3 can be increased, and the second pieces 75a and 75b and the third pieces 76a, 76b, 76c, and 76d can be easily magnetized. Therefore, the rotor magnet 23 formed by magnetizing the first magnetic member 73 is likely to be suitably arranged in the Halbach array.

Here, if the rotor core 22 is simply made of the non-magnetic member, the amount of the second magnetic flux F2 and the amount of the third magnetic flux F3 can be increased, but the amount of the first magnetic flux F1 decreases, and there is a possibility that it is difficult to suitably magnetize the first pieces 74a and 74b. On the other hand, the rotor core 22 has the hole 23a located on the radially inner side of the radially magnetized portion 22b according to the present embodiment. Therefore, the magnetic flux from the tooth portion Yb can be guided radially inward by the second magnetic member M by magnetizing the first magnetic member 73 in the state where the second magnetic member M is inserted into the hole 22a as described above. As a result, it is possible to suppress the decrease in the amount of the first magnetic flux F1 passing through the first pieces 74a and 74b, which serve as the radially magnetized portions 23b, in the radial direction. Therefore, the first pieces 74a and 74b can be suitably magnetized, and the radially magnetized portions 23b can be suitably formed.

As described above, according to the present embodiment, each of the first magnetic flux F1, the second magnetic flux F2, and the third magnetic flux F3 can be suitably generated in a well-balanced manner, and each of the first magnetic member pieces 73a can be suitably made to serve as the magnetized portion 23a. Therefore, it is easy to magnetize the first magnetic member 73 fixed to the rotor core 22 to form the rotor magnet 23 having the Halbach array.

For example, when the second magnetic member M is in contact with the first magnetic member 73, the magnetic flux from the tooth portion Yb easily flows to the second magnetic member M, and the first magnetic flux F1 increases while the second magnetic flux F2 and the third magnetic flux F3 decrease. Therefore, there is a possibility that it is difficult to magnetize the second pieces 75a and 75b and the third pieces 76a, 76b, 76c, and 76d. On the other hand, the hole 22a is located at a position separated radially inward from the outer peripheral surface of the rotor core 22 according to the present embodiment. Therefore, the second magnetic member M inserted into the hole 22a does not come into contact with the first magnetic member 73. As a result, the magnetic flux can be suppressed from excessively flowing through the second magnetic member M, and the decrease in the second magnetic flux F2 and the third magnetic flux F3 can be suppressed. Therefore, the second pieces 75a and 75b and the third pieces 76a, 76b, 76c, and 76d can be easily magnetized.

For example, if the second magnetic member M is excessively separated radially inward from the first magnetic member 73, there is a possibility that the first magnetic flux F1 guided by the second magnetic member M to flow radially inward excessively decreases. Therefore, there is a possibility that it is difficult to magnetize the first pieces 74a and 74b. On the other hand, the hole 22a is provided in a portion of the rotor core 22 closer to the radially outer side according to the present embodiment. Therefore, it is possible to magnetize the first magnetic member 73 while preventing the second magnetic member M inserted into the hole 22a from being excessively separated from the first magnetic member 73. As a result, the excessive decrease in the first magnetic flux F1 can be suppressed, and the first pieces 74a and 74b can be easily magnetized.

According to the present embodiment, the radial distance L1 from the outer peripheral surface of the rotor core 22 to the radially outer end of the hole 22a is 1 mm or more and 5 mm or less. By setting the distance L1 to such a value, it is possible to suppress the second magnetic member M inserted into the hole 22a from being too close to or excessively separated from the first magnetic member 73. Therefore, it is possible to suitably set the balance among the amount of the first magnetic flux F1, the amount of the second magnetic flux F2, and the amount of the third magnetic flux F3, and to suitably magnetize each of the first magnetic member pieces 73a. As a result, it is easy to magnetize the first magnetic member 73 fixed to the rotor core 22 to suitably form the rotor magnet 23 having the Halbach array. The rotor magnet 23 having the Halbach array can be more suitably formed by setting the distance L1 to 1.5 mm or more and 3 mm or less. Furthermore, the rotor magnet 23 having the Halbach array can be more suitably formed by setting the distance L1 to 2 mm.

For example, when the second magnetic members M inserted into the holes 22a are located radially inside the second pieces 75a and 75b and the third pieces 76a, 76b, 76c, and 76d, there is a possibility that the magnetic flux passing through the second pieces 75a and 75b and the third pieces 76a, 76b, 76c, and 76d is attracted to the second magnetic member M. Therefore, each flow of the second magnetic flux F2 and the third magnetic flux F3 are hindered, and there is a possibility that the first non-radially magnetized portions 25a and 25b and the second non-radially magnetized portions 26a, 26b, 26c, and 26d are not suitably formed.

On the other hand, the circumferential dimension L2 of the hole 22a is equal to or smaller than the circumferential dimension L3 of the radially magnetized portion 23b according to the present embodiment. Therefore, it is possible to make the second magnetic members M inserted into the holes 22a to be less likely to be located radially inside the second pieces 75a and 75b and the third pieces 76a, 76b, 76c, and 76d. As a result, it is possible to suppress each flow of the second magnetic flux F2 and the third magnetic flux F3 from being hindered by the second magnetic member M, and it is easy to suitably form the first non-radially magnetized portions 25a and 25b and the second non-radially magnetized portions 26a, 26b, 26c, and 26d.

According to the present embodiment, the hole 22a has a line-symmetric shape with respect to the circumferential center line CL1 passing through the circumferential center of the radially magnetized portion 23b when viewed along the axial direction. Therefore, the first magnetic flux F1 attracted by the second magnetic member M inserted into the hole 22a can be easily divided equally on both the sides in the circumferential direction. As a result, it is possible to suppress a variation in magnetization by the first magnetic flux F1. Therefore, the rotor magnet 23 having the Halbach array can be more suitably formed.

According to the present embodiment, the plurality of holes 22a are provided, and each of the holes 22a is located radially inside each of the radially magnetized portions 23b. Therefore, each of the plurality of first pieces 74a and 74b can be suitably made to serve as the radially magnetized portion 23b by inserting the second magnetic members M into the plurality of holes 22a and performing magnetization.

All the holes 22a are located at positions different from the first non-radially magnetized portions 25a and 25b, which are the circumferentially magnetized portions, in the circumferential direction according to the present embodiment. Therefore, the second magnetic members M inserted into the holes 22a are not located radially inside the second pieces 75a and 75b which serve as the first non-radially magnetized portions 25a and 25b. As a result, the magnetic flux in each of the second pieces 75a and 75b can be more easily made to flow in the circumferential direction, and the first non-radially magnetized portions 25a and 25b can be more suitably formed.

In the present embodiment, all the holes 22a are located at positions different from any of the non-radially magnetized portions 23c in the circumferential direction. Therefore, the second magnetic members M inserted into the holes 22a are not located radially inside the second pieces 75a and 75b and the third pieces 76a, 76b, 76c, and 76d which serve as the non-radially magnetized portions 23c. As a result, it is possible to prevent the second magnetic member M from hindering the flow of the magnetic flux in each of the second pieces 75a and 75b and the third pieces 76a, 76b, 76c, and 76d. Therefore, the non-radially magnetized portion 23c can be more suitably formed.

The above-described numerical range of the distance L1 is a numerical range in which an effect can be particularly suitably obtained when all the holes 22a are located at positions different from any of the non-radially magnetized portions 23c in the circumferential direction.

According to the present embodiment, the hole 22a is the through-hole penetrating the rotor core 22 in the axial direction. Therefore, the first magnetic member 73 can be suitably magnetized over the entire axial direction by inserting the second magnetic member M through the hole 22a in the entire axial direction. As a result, the rotor magnet 23 arranged in the Halbach array can be more suitably formed.

The present invention is not limited to the embodiment described above, and the following configurations and methods can also be employed. The rotor magnet is not particularly limited as long as the rotor magnet is fixed to the outer peripheral surface of the rotor core. The rotor magnet may be a single member. When the rotor magnet is the single member, the rotor magnet may have an annular shape such as a cylindrical shape. That is, when the rotor magnet is the single member and includes the plurality of magnetized portions as in the above-described embodiment, each of the plurality of magnetized portions may be a part of a cylindrical single member. The plurality of rotor magnets may be arranged at intervals in the circumferential direction. The rotor magnets are not necessarily arranged in the Halbach array. In this case, for example, the magnetization directions of the rotor magnets may be only the radial direction.

The rotor core is not particularly limited as long as the rotor core has the hole. The rotor core may be a magnetic member made of a magnetic material. The hole is not particularly limited as long as the hole is recessed from the surface on the one side in the axial direction of the rotor core to the other side in the axial direction. The hole may be the hole that does not penetrate the rotor core in the axial direction and has the bottom. Although the one side in the axial direction is defined as the upper side, and the other side in the axial direction is defined as the lower side in the above-described embodiment, the present invention is not limited thereto. The one side in the axial direction may be the lower side in the above-described embodiment, and the other side in the axial direction may be the upper side in the above-described embodiment. The number of holes is not limited as long as one or more holes are provided. A shape of the hole is not particularly limited. The position of the hole in the rotor core is not particularly limited. A size of the hole is not particularly limited.

A method of manufacturing the rotor is not particularly limited as long as the first magnetic member is magnetized in the state where the second magnetic member is inserted into the hole in the magnetization step. The second magnetic member to be inserted into the hole is not particularly limited as long as the second magnetic member is the magnetic member made of the magnetic material. A gap may be provided between the second magnetic member inserted into the hole and the inner surface of the hole. In the magnetization step, the rotor core and the first magnetic member are not necessarily positioned using the hole. The first magnetic member may have no magnetic anisotropy.

The application of the motor of the embodiment described above is not particularly limited. The motor may be installed on a vehicle or the like, for example. The configurations described in the present specification can be combined as appropriate within a scope that is not contradictory to each other.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A method of manufacturing a rotor, which includes a rotor core rotatable about a central axis and a rotor magnet fixed to an outer peripheral surface of the rotor core, the method comprising:

a magnetization step of magnetizing, using a removable magnetizing yoke, a first magnetic member fixed to the outer peripheral surface of the rotor core to form the rotor magnet, wherein the first magnetic member comprises:

a first piece, magnetized to serve as a first radially magnetized portion, and
a second piece, magnetized to serve as a first non-radially magnetized portion,
wherein the rotor core has a hole recessed from a surface on one side in an axial direction of the rotor core to another side in the axial direction, and
in the magnetization step, the first magnetic member is magnetized in a state where a second magnetic member made of a magnetic material is inserted into the hole, wherein the hole is aligned with the first piece of the first magnetic member in a radial direction, the hole is radially inward from the first magnetic member, the second piece of the first magnetic member is offset from the first piece in a circumferential direction, and the magnetization step comprises:
magnetizing the first piece in the radial direction;
magnetizing the second piece in the circumferential direction; and
an extraction step of removing the second magnetic member from the hole following the magnetization step.

2. The method of manufacturing a rotor according to claim 1, wherein in the magnetization step, the rotor core and a plurality of first magnets of the first magnetic member are positioned in the circumferential direction of the hole.

3. The method of manufacturing a rotor according to claim 2, wherein the first magnetic member has an annular shape surrounding the rotor core, and magnetization of the first magnetic member in the magnetization step is performed using a current applied to the magnetizing yoke, wherein the magnetizing yoke is located on a radially outer side of the first magnetic member,
the magnetizing yoke includes:
an annular core back portion surrounding the first magnetic member; and
a plurality of tooth portions extending radially inward from the core back portion and arranged along the circumferential direction, and
in the magnetization step, the rotor core and the first magnetic member are positioned at positions where the hole is located on a radially inner side of the tooth portion.

4. The method of manufacturing a rotor according to claim 3, wherein
the rotor magnet includes a plurality of magnetized portions arranged in a Halbach array along the circumferential direction,
the magnetized portions include:
a plurality of radially magnetized portions whose magnetization directions are the radial direction; and
a plurality of non-radially magnetized portions whose magnetization directions are different from the radial direction, and
the first magnetic member is configured by connecting a plurality of first magnetic member pieces, which are magnetized to serve as the magnetized portions, in the circumferential direction.

5. The method of manufacturing a rotor according to claim 4, wherein the rotor core is a non-magnetic member made of a non-magnetic material.

6. The method of manufacturing a rotor according to claim 4, wherein a circumferential dimension of the hole is equal to or smaller than a circumferential dimension of the radially magnetized portion.

7. The method of manufacturing a rotor according to claim 4, wherein the hole has a line-symmetric shape with respect to a circumferential center line passing through a circumferential center of the radially magnetized portion when viewed along the axial direction.

8. A method of manufacturing a rotor, which includes a rotor core rotatable about a central axis and a rotor magnet fixed to an outer peripheral surface of the rotor core, the method comprising:
a magnetization step of magnetizing, using a removable magnetizing yoke, a first magnetic member fixed to the outer peripheral surface of the rotor core to form the rotor magnet, wherein the first magnetic member comprises:
a first piece, magnetized to serve as a first radially magnetized portion, and
a second piece, magnetized to serve as a first non-radially magnetized portion,
wherein the rotor core has a hole recessed from a surface on one side in an axial direction of the rotor core to another side in the axial direction, and
in the magnetization step, the first magnetic member is magnetized in a state where a second magnetic member made of a magnetic material is inserted into the hole, wherein the hole is aligned with the first piece of the first magnetic member in a radial direction, the hole is radially inward from the first magnetic member, the second piece of the first magnetic member is offset from the first piece in a circumferential direction, and the magnetization step comprises:
magnetizing the first piece in the radial direction; and
magnetizing the second piece in the circumferential direction, wherein a radial distance from the outer peripheral surface of the rotor core to a radially outer end of the hole is 1 millimeter (mm) or more and 5 mm or less.

9. The method of manufacturing a rotor according to claim 1, further comprising
a fixing step of fixing the first magnetic member to the rotor core, and
wherein the first magnetic member has magnetic anisotropy.

10. A method of manufacturing a motor comprising the method of manufacturing a rotor according to claim 1.

11. The method of manufacturing a rotor according to claim 1, wherein the hole is offset from the second piece in the circumferential direction.

12. The method of manufacturing a rotor according to claim 1, wherein the hole is aligned with only the first piece of the first magnetic member in the radial direction.

13. The method of manufacturing a rotor according to claim 8, wherein the hole is offset from the second piece of the first magnetic member in the circumferential direction.

14. The method of manufacturing a rotor according to claim 1, wherein the extraction step further includes extracting at least one of the rotor core or the rotor magnet from the removable magnetizing yoke.

15. The method of manufacturing a rotor according to claim 1, wherein the extraction step further includes extracting the rotor core and the rotor magnet from the removable magnetizing yoke.

16. The method of manufacturing a rotor according to claim 1, wherein the hole has a line-symmetrical shape with respect to a circumferential center line.

* * * * *